United States Patent [19]
Miura et al.

[11] Patent Number: 5,841,679
[45] Date of Patent: Nov. 24, 1998

[54] VECTOR COMPUTATION DEVICE AND VECTOR COMPUTATION METHOD

[75] Inventors: Yoichi Miura; Masao Kumagishi, both of Saitama-ken, Japan

[73] Assignee: Wacom Co., Ltd., Japan

[21] Appl. No.: 867,415

[22] Filed: Jun. 2, 1997

[30] Foreign Application Priority Data

Apr. 26, 1996 [JP] Japan .................................. 8-131192

[51] Int. Cl.$^6$ .............................. G06F 7/00; G06F 7/52; G06F 7/02
[52] U.S. Cl. .................. 364/715.06; 364/769; 340/146.2
[58] Field of Search ..................... 364/715.06, 736.03, 364/769; 340/146.2

[56] References Cited

U.S. PATENT DOCUMENTS

| | | | |
|---|---|---|---|
| 4,760,374 | 7/1988 | Moller | 364/715.06 |
| 5,051,939 | 9/1991 | Nakamura | 364/715.06 |
| 5,187,675 | 2/1993 | Dent et al. | 364/715.06 |
| 5,457,645 | 10/1995 | Suzuki | 364/715.06 |

*Primary Examiner*—Tan V. Mai
*Attorney, Agent, or Firm*—Finnegan, Henderson, Farabow, Garrett & Dunner, L.L.P.

[57] ABSTRACT

A method of determining which search target vector from a plurality of search target vectors is closest to an input vector. A device to perform the method is also disclosed. Rather then perform a distance calculation for each and every search target vector, the disclosed method narrows the field of the search through a simple process. The input vector is compared to each search target vector, and a mask is used to evaluate the result of the comparison. Then, the actual distance is calculated for those search target vectors within a search range of the input vector.

16 Claims, 9 Drawing Sheets

| Ai or Bi | GRAY CODE | EX-OR OUTPUT 1 | EX-OR OUTPUT 2 |
|---|---|---|---|
| 1 4 | 0 1 0 0 1 | 1 0 1 1 0 | 1 0 1 1 0 |
| 1 5 | 0 1 0 0 0 | 1 0 1 1 1 | 1 0 1 1 1 |
| 1 6 | 1 1 0 0 0 | 0 0 1 1 1 | 0 0 1 1 1 |
| 1 7 | 1 1 0 0 1 | 0 0 1 1 0 | 0 0 1 1 0 |
| 1 8 | 1 1 0 1 1 | 0 0 1 0 0 | 0 0 1 0 0 |
| 1 9 | 1 1 0 1 0 | 0 0 1 0 1 | 0 0 1 0 1 |
| 2 0 | 1 1 1 1 0 | 0 0 0 0 1 | 0 0 0 0 1 |
| 2 1 | 1 1 1 1 1 | 0 0 0 0 0 | 0 0 0 0 0 |
| 2 2 | 1 1 1 0 1 | 0 0 0 1 0 | 0 0 0 1 0 |
| 2 3 | 1 1 1 0 0 | 0 0 0 1 1 | 0 0 0 1 1 |
| 2 4 | 1 0 1 0 0 | 0 1 0 1 1 | 0 1 0 1 1 |
| 2 5 | 1 0 1 0 1 | 0 1 0 1 0 | 0 1 0 1 0 | a   b

FIG. 5

| Ai or Bi | GRAY CODE | EX-OR OUTPUT 1 | EX-OR OUTPUT 2 |
|---|---|---|---|
| 10 | 0 1 1 1 1 | 0 0 1 1 1 | 0 0 1 1 1 |
| 11 | 0 1 1 1 0 | 0 0 1 1 0 | 0 0 1 1 0 |
| 12 | 0 1 0 1 0 | 0 0 0 1 0 | 0 0 0 1 0 |
| 13 | 0 1 0 1 1 | 0 0 0 1 1 | 0 0 0 1 1 |
| 14 | 0 1 0 0 1 | 0 0 0 0 1 | 0 0 0 0 1 |
| 15 | 0 1 0 0 0 | 0 0 0 0 0 | 0 0 0 0 0 |
| 16 | 1 1 0 0 0 | 1 0 0 0 0 | 1 0 0 0 0 |
| 17 | 1 1 0 0 1 | 1 0 0 0 1 | 1 0 0 0 1 |
| 18 | 1 1 0 1 1 | 1 0 0 1 1 | 1 0 0 1 1 |
| 19 | 1 1 0 1 0 | 1 0 0 1 0 | 1 0 0 1 0 |
| 20 | 1 1 1 1 0 | 1 0 1 1 0 | 1 0 1 1 0 |
| 21 | 1 1 1 1 1 | 1 0 1 1 1 | 1 0 1 1 1 | c          d

FIG. 8
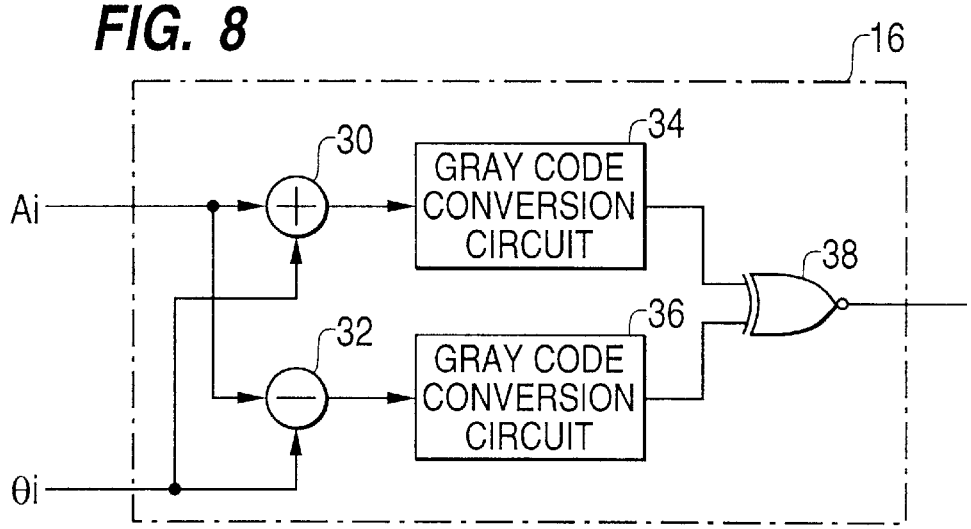
FIG. 9
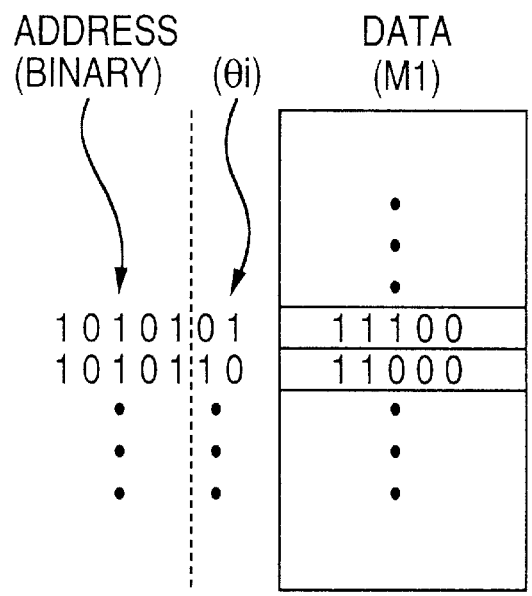
FIG. 10
| ADDRESS ($\theta i$) | DATA (M2) |
|---|---|
| 0 0 1 | 1 1 1 1 0 |
| 0 1 0 | 1 1 1 0 0 |
| 0 1 1 | 1 1 0 0 0 |
| 1 0 0 | 1 1 0 0 0 |

VECTOR COMPUTATION DEVICE AND VECTOR COMPUTATION METHOD

BACKGROUND OF THE INVENTION

1. Field of the Invention

The present invention relates to a vector computation device and a vector computation method to search data close to the input vector data from plural vector data as a search target.

2. Description of the Related Art

When there is an input vector data possessing n-order elements, there is a general need for retrieving data close to the input vector data from search target vector data. Such processing is used, for example, in a case of the middle layer which is the closest to the input data files in a neural network, conducting a resembling picture search without using a character index in a picture data base.

Referring to FIG. 13, an apparatus compares input vector data and search target vector data. The distance calculation circuit 100 calculates each distance between the input vector A and plural search target vector data B. The minimum value judgement circuit 102 selects the one which has the minimum distance between the two vectors in accordance with the calculation result.

The distance calculation circuit 100 may calculate several distances between vectors. For example, Euclidean distance and Manhattan distance may be calculated. Suppose vector A and vector B are both n-order and elements of vector A are $(A_1, A_2, \ldots, A_n)$ while elements of vector B are $(B_1, B_2, \ldots, B_n)$ the Euclidean distance is $\sqrt{\Sigma(Ai-Bi)^2}$ and the Manhattan distance is calculated by $\Sigma|Ai-Bi|$. The distance calculation between vectors in this manner shall be conducted between vector A and all search target vectors B, and the search target vector B having the minimum distance will be extracted.

This vector search method calculates vector distances between the input vector A and each search target vector B. This demands a heavy burden for processing. The Euclidean distance is particularly burdensome. The subtraction result for each element of the two vectors must be squared, and this is a complex calculation.

These distance calculations also require calculation between input vector A and all of the search target vectors B, so that as the number of search target vectors increases so does the quantity for the calculation, causing the search time to increase. These problems become more noticeable as the distance calculation is conducted by software.

SUMMARY OF THE INVENTION

It is the purpose of the present invention to solve these problems by providing a vector calculation device and a vector calculation method to narrow the search target field through simple processing, reducing the burden for processing in searching for a vector close to the input vector among plural search target vectors, and shortening the processing time.

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

The present invention comprises first and second Gray code conversion means, first and second mask generation means, and a judgement means. A data of certain elements in an input vector is converted to a Gray code by the first Gray code conversion means, and a data of certain elements in search target vector is converted to a Gray code by the second Gray code conversion means.

The first mask generating means generates first mask data. The first mask data designates bit positions which change when Gray codes corresponding to the upper limit value and the lower limit value of the search target are compared. The second mask generating generates second mask data. The second mask data designates lower bits which reflect changes when selected elements of all vectors included in the search range are converted to Gray codes.

At the judgement means, a comparison between each element of the input vector and the search target vectors is conducted for all bits except those bits designated by the first and the second mask data, enabling a judgement of whether the search condition is met or not by a simple calculation, thereby making it possible to reduce the search target field with simple processing.

Each of the first and second Gray code conversion means, and each of the first and second mask generating means, can conduct the predetermined conversion processing easily using a conversion table.

Another method for converting to Gray codes with simple processing is to conduct an XOR for each bit between a binary code corresponding to each element of the input vector and a data attained by shifting this binary code to the right by 1 bit by the first and the second Gray code conversion means in order to attain a corresponding Gray code.

It is also possible to configure the first mask generating means to attain the first mask data with easy processing. The first mask generating means comprises third and fourth Gray code conversion means to output Gray codes corresponding to the upper limit value and the lower limit value of the search range, and a computation means to conduct an XOR for each bit of these two Gray codes.

The second mask generating means calculates an integer P wherein $2^{P-2}<74 \leq 2^{P-1}$. The search range is from $-\theta$ to $+\theta$ centered on the input vector element. The second mask data then includes only the lower P bits. These first and second mask data require only one time calculation per each input vector element, so that even if there are plural search target vectors, the burden for processing is light.

The present invention is also equipped with a distance calculation means and a minimum value judgement means. A distance between two vectors is calculated only when the search condition by the judgement means mentioned above is meet for all elements of an input vector and a search target vectors. The minimum value of the distance is judged when there are plural search target vectors.

Therefore, compared to the case of calculating distances between all the search target vectors and the input vectors, a burden for searching the search target vector which has the minimum distance is reduced, thereby shorten the processing time.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings.

FIG. 3 shows a specific example of a data comparison;

FIG. 4 is a chart showing a searchable range of the search target vector by using the vector calculation method in accordance with the present invention;

FIG. 5 is a chart showing a searchable range of the search target vector by using the vector calculation method in accordance with the present invention;

FIG. 8 is a diagram to show a specific configuration of the mask generating circuit;

FIG. 9 is a chart to show a specific example of the conversion table for generating mask data M1;

FIG. 10 is a chart to show a specific example of the conversion table for generating mask data M2;

DESCRIPTION OF THE PREFERRED EMBODIMENT

The vector calculation device and the vector calculation method according to the present invention extracts vectors which meet with a search condition without a distance calculation when a search is conducted for the vector closest to the input vector among plural search target vectors. By conducting a distance calculation between each extracted search target vector and the input vector, the closest search target vector to the input vector can be identified with a small amount of calculation. Reference will now be made in detail to the present preferred embodiments of the invention, examples of which are illustrated in the accompanying drawings.

FIGS. 1(A) to 1(D) are diagrams to describe an outline of the vector calculation method in accordance with the present invention. For example, the input vector A and the search target vector B are both 1st order vectors represented by 4 bits.

Figure 1:
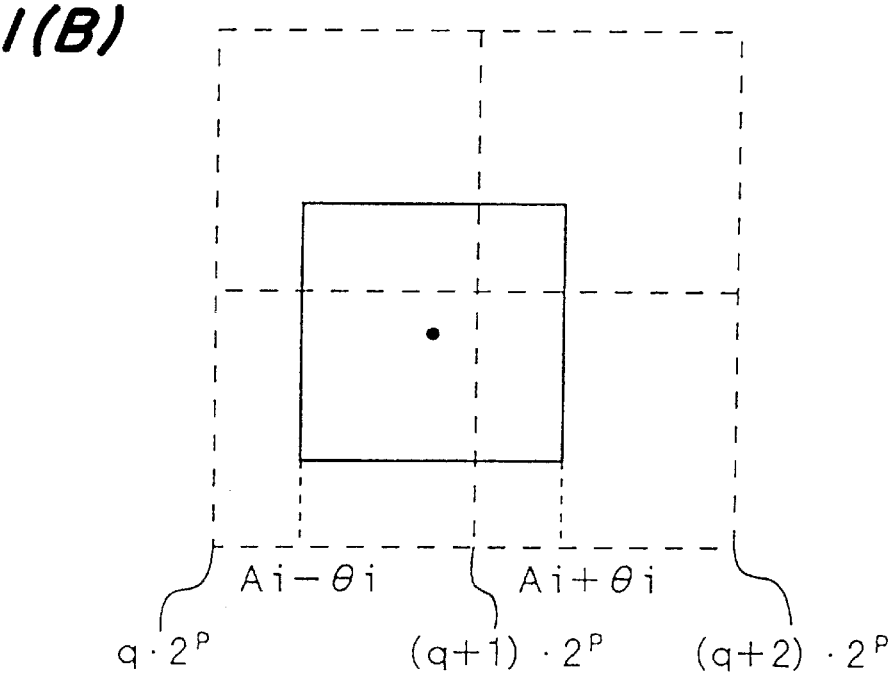
FIGS. 1(A)–1(D) show diagrams to describe an outline of the vector calculation method in accordance with the present invention.

Generally speaking, when the input vector and search target vectors are compared, a distance comparison between vectors can be conducted with high speed if the distance between vectors is judged either close or far by checking whether a data is a match or not without making a distance calculation. As shown in FIG. 1(A), when the 1st order vector A with elements "1010" and the 1st order B with elements "1011" are compared, they do not match if all bits are compared. By masking the last position bit, however, and comparing the first three bits, a match occurs.

FIG. 1(B) illustrates an example of expanding this data comparison to 2nd order vectors. When only one component is considered, it can be considered exactly in the same manner as in the case of the 1st order shown in FIG. 1(A).

For example, one component of the input vector A is $A_i$, and one component of the search target vector B is included in a range between $(A_i-\theta_i)$ and $(A_i+\theta_i)$. Then, the upper bits match, excluding the lower P bits (one bit or plural bits are determined by $\theta_i$) when each element $A_i$ and $B_i$ are displayed with bits. If each vector to be compared is more than 2nd order, i.e. multiple order, then this kind of matching identification shall be conducted for each element.

As mentioned above, only the upper bits are compared for identification judgement. In binary code, however, all bits change by a difference of an order of magnitude from q. For example as shown in FIG. 1(C), the binary code for "7" is "0111" and the binary code for "8" is "1000", so that even though the actual difference of the two data is "1", the upper bits do not match, and the data comparison by identification judgement of the upper bits cannot be conducted. For this reason, the present invention uses Gray codes which change only 1 bit if a change in datum to be compared is ±1. If an upper bit changes by an increase of an order of magnitude, then the data comparison for each bit occurs after excluding the changed bit.

Referring to FIG. 1(D), in comparing the Gray codes of "7" and "8" which are "0100" and "1100" respectively, if the lower three bits are compared excluding the variable bit (in this case the most significant bit), then the data which are close to each other match. In this way, when comparing lower bits determined by a search range θ with the upper limit and the lower limit of the search range, mask those bits which vary, exclude those masked bits, and conduct matching evaluation of each of the corresponding bits. Thus, the search target vector B, which is close to the input vector A, can be searched without conducting a distance calculation.

Figure 2:
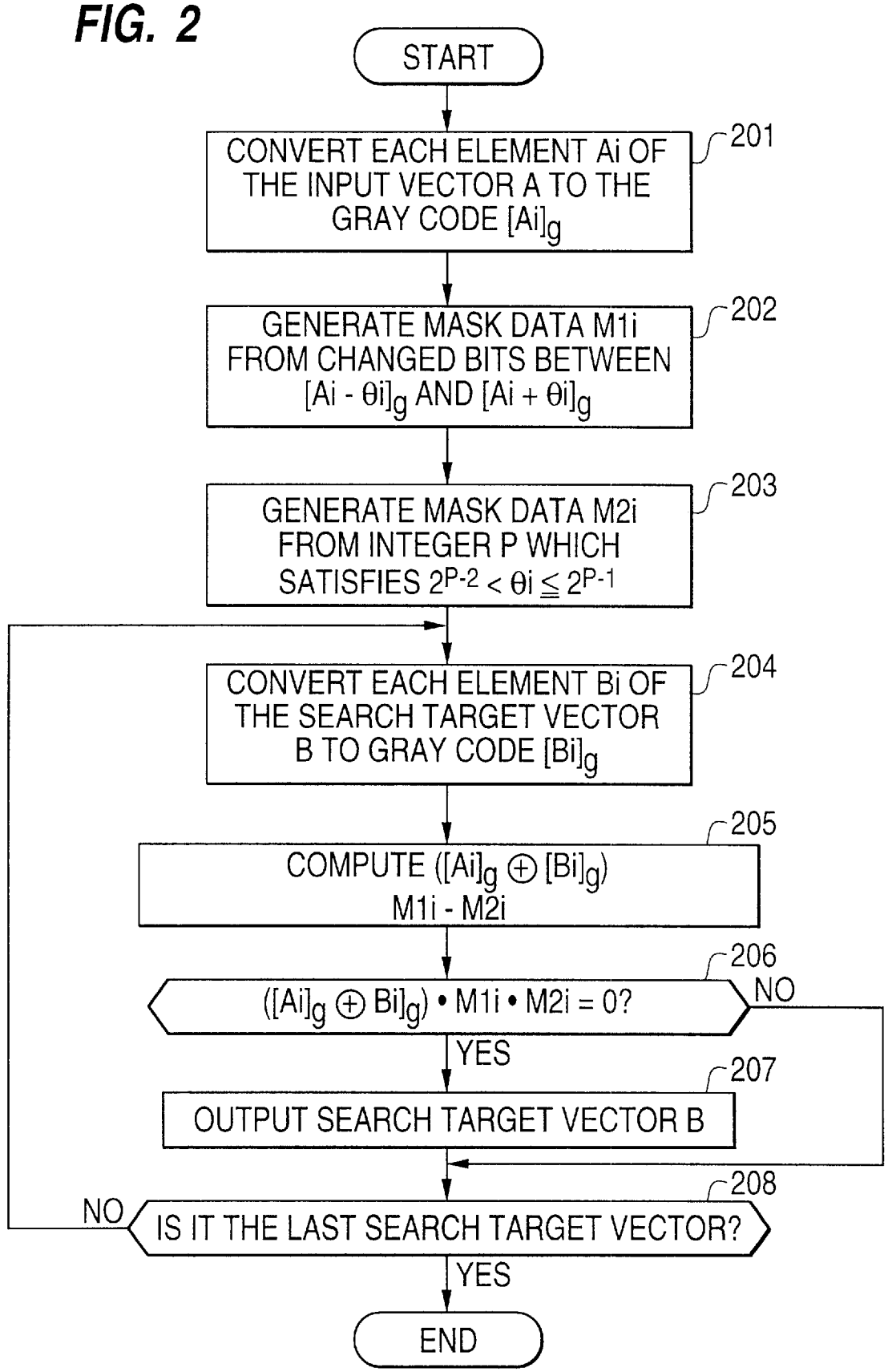
FIG. 2 is a flow chart of a processing procedure showing a specific vector calculation method in accordance with the present invention.

FIG. 2 is a flow chart showing a specific processing procedure for the vector calculation method. FIG. 3 is a diagram to show a specific example of a data comparison, with an example of conducting the comparison of the first order vectors. The input vector A has the element of "21", and the search target vector B has the element of "22" or "19". Now the vector calculation method in accordance with the present invention will be described with the reference to the flow chart in FIG. 2.

First, consider a case wherein Ai=21 and Oi=1. Each element $A_i$ of input vector A is converted to Gray codes [Ai]g (step 201). As shown in FIG. 3, if Ai=21, then it gets converted to corresponding Gray codes "11111."

Next, the first mask data M1i is created in order to mask those bits which change mutually when the upper limit and the lower limit of the search target range are compared (step 202). Ai minus 1 equals 20, and its Gray code becomes "11110". Also, Ai plus 1 equals 22, and its Gray code becomes "11101". When these two Gray codes are compared, making those bits which change as "0" and those bits which do not change as "1", "11100" is created as the first mask data M1i.

The second mask data M2i is created to mask lower bits determined in accordance with θi (step 203). Specifically, by attaining an integer P which satisfies $2^{P-2}<\theta_i<2^{P-1}$, (P=0 if $\theta_2=0$), the second mask data M2i making the lower P bits "0" and the remaining upper bits "1" which become "11110" is created. The relationship between θi and P is as follows: if θi=2, then P=2, if Oi=3 or 4, then P=3, if θi=5~8, then P=4.

Then, each element Bi of the search target vector B is converted to the Gray codes [Bi]g (step 204). A first search target vector B with the element Bi as "22" is converted to the corresponding Gray code "11101". In steps 201 to 204, it is acceptable to start from any step as well as conducting a concurrent processing.

Thus, after obtaining Gray codes [Ai]g and [Bi]g for the data Ai and Bi, and the mask data M1i and M2i, a predetermined bit calculation (step 205) occurs using those 4 data, and whether all bits are "0" or not is judged (step 206). Specifically, bit by bit for the elements Ai of the input vector A and the elements Bi of the search target vector B, an XOR operation for [Ai] and [Bi] is conducted, and to that result an AND operation is conducted for M1i and M2i.

The XOR operations judge whether the noted bits (bits not masked) match or not. If the noted bits all match, then all the noted bits become "0". The XOR of M1i is to exclude, if the upper bits change when the upper limit and the lower limit of the search target (Ai−θi and Ai+θi) are compared, the changed bits from the object for the match processing, and by conducting the XOR the changed bits are forced to become "0". The XOR of M2i is to exclude the lower bits which change within the range of Ai±θi from the object for the match processing, and by conducting the XOR the predetermined lower bits are forced to become "0".

By the above mentioned computation, if the predetermined bits decided by the mask data M1i and M2i are forced to become "0", and other bits of Ai and Bi match, then all bits as the result of the computation become "0".

For example, when XOR is conducted for each bit of Ai="21" and Bi="22", then "00010" is attained as the result. Since M1i is "11100" and M2i is "11110", to conduct XOR for each bit of M1i and M2i means to force the lower two bits wherein at least one side is "0" to become "0", so that the end of result of the computation becomes "00000". Therefore, all the bits of the computation result are "0" and judged to be included within the range of Ai±θi (=20±1), and B is outputted as a vector to satisfy the search condition (step 207).

Then, the process determines if the search object vector which conducted the above mentioned predetermined computation is a final vector or not (step 208), i.e. whether there are other search target vectors which have not finished the predetermined calculation. The process repeats step 204 until the process for all the search target vectors are completed.

For example, if a second search vector B having an element Bi=19 exists, the element Bi is converted to the Gray code at step 204, and at step 205 XOR is conducted for each bit of Bi and Ai in Gray codes. More specifically, the Gray code of Bi (=19) is "11010"; the Gray code of Ai (=21) is "11111"; and the result of conducting the XOR for each bit is "00101". Consequently, by forcing the lower two bits which are determined by M1i and M2i to become "0" the final result, "00100", is attained. In this case, not all the bits are "0" so that it is not a vector to satisfy the search condition, and it will not be outputted at step 207.

In this way, for each element of the two vectors to be compared, only predetermined bits are masked, and by conducting the matching for each corresponding bit, whether the elements of one vector are included within a certain range centered on the elements of the other vector is judged.

FIG. 4 is a table showing a searchable range of the search target vectors by using the computation method in accordance with the present invention, with an example of the elements Ai of the first order vector being "21".

As mentioned above, when θi=1 by comparing the respective Gray codes of "20" and "22", M1 becomes "11100" and the integer P to satisfy $2^{P-2}<\theta<2^{P-1}$ is "1" M2i becomes "11110". $_{51}$M1i−M2i is "11100", and the lower two bits are masked. Consequently, the search target vector B, with an element Bi having upper three bits all "0" when XOR is conducted, is the vector which satisfies the search condition Ai±1.

In FIG. 4, the range a is the range having upper three bits all "0" when the above mentioned XOR is conducted, so that the search target vectors B having Bi=20, 21, 22, and 23 are found to have satisfied the search condition.

In the same manner, when θi=2 by comparing the respective Gray codes of 19 and 23, M1i becomes "01001" and the integer P to satisfy $2^{P-2}<\theta\leq2^{P-1}$ is "2". Thus, M2i becomes 11100. M1i−M2i is 01000, and the lower three bits are masked. Consequently, the search target vector B, having element Bi whose upper two bits are both "0" when the XOR is conducted, is a vector which satisfies the search condition Ai±2.

In FIG. 4 the range shown with area b is, when above mentioned XOR is conducted, where upper two bits become "0", and the search target vector B which is in the range of Bi=16 to 23 is searched as meeting with the search condition.

FIG. 5 is a table that shows a searchable range of search target vectors using a computation method in accordance with the present invention. An example of an element Ai of the first order vector is "15". When Ai=15, and i=1 or 2, the highest bit of the element Bi of the search target vector B changes when Bi is 15 or 16.

When θi=1, by comparing Gray codes of "14" and "16", M1i becomes 01110 and integer P to meet $2^{P-2}<\theta<2^{P-1}$ is "1. Thus, M2i becomes 11110. M1i−M2i is 01110, and both the highest bit and the lowest bit (altogether two bits) are masked. Consequently, the search target vector B with elements Bi having remaining all three bits "0" when XOR is conducted, is a vector filing the search condition of Ai±1.

In FIG. 5, the area c is a range wherein all middle three bits become "0" when XOR is conducted. The search target vector B as Bi=14, 15, 16, or 17 to all meet the search condition.

In the same manner, when θi=2, by comparing the Gray codes of "13" and "14", M1i becomes "01101", and the integer P to satisfy $2^{P-2}<\theta<2^{P-1}$ is 2. Thus, M2i becomes 11100. M1i−M2i becomes "01100", and the two lower bits and the highest bit (altogether three bits) are marked. Consequently, the search target vector B with elements Bi having the second and third bits from the highest to be "0" is the vector meeting the search condition of Ai±2.

In FIG. 5, area d is the range wherein the second and third bits from the highest are "0" after XOR is conducted, and the search target vector B in the range of Bi=12~19 meets the search condition.

In this way, a vector close to the input vector A is searched from the plural search target vectors B, by the vector computation method in accordance with the present invention, without conducting a complex computation on each element of the vectors A and B to be compared. The process judges whether the search condition is meet or not by checking whether predetermined bits match or not, which reduces the burden of processing and thereby shortens the processing time.

According to the present method of vector computation, the predetermined bits are masked when two data Ai and Bi are compared. This leads to searching a broader range Bi than original range Ai±θi. If a limited number of vectors which meet with a search condition are extracted out of numerous search target vectors, then by conducting the distance calculation between the extracted plural search target vectors and the input vector, a more accurate search can be conducted.

Even in case the distance calculation is conducted at the last step, by using the vector calculation method in accordance with the present invention, the search target vectors for the distance calculation are narrowed down, thereby reducing the processing burden as well as shortening the processing time.

The above mentioned example dealt with the case for the first order vectors A and B. The same principle can be also applied to multiple dimensional vectors above the second order by making comparison between each element.

Figures 6, 7:
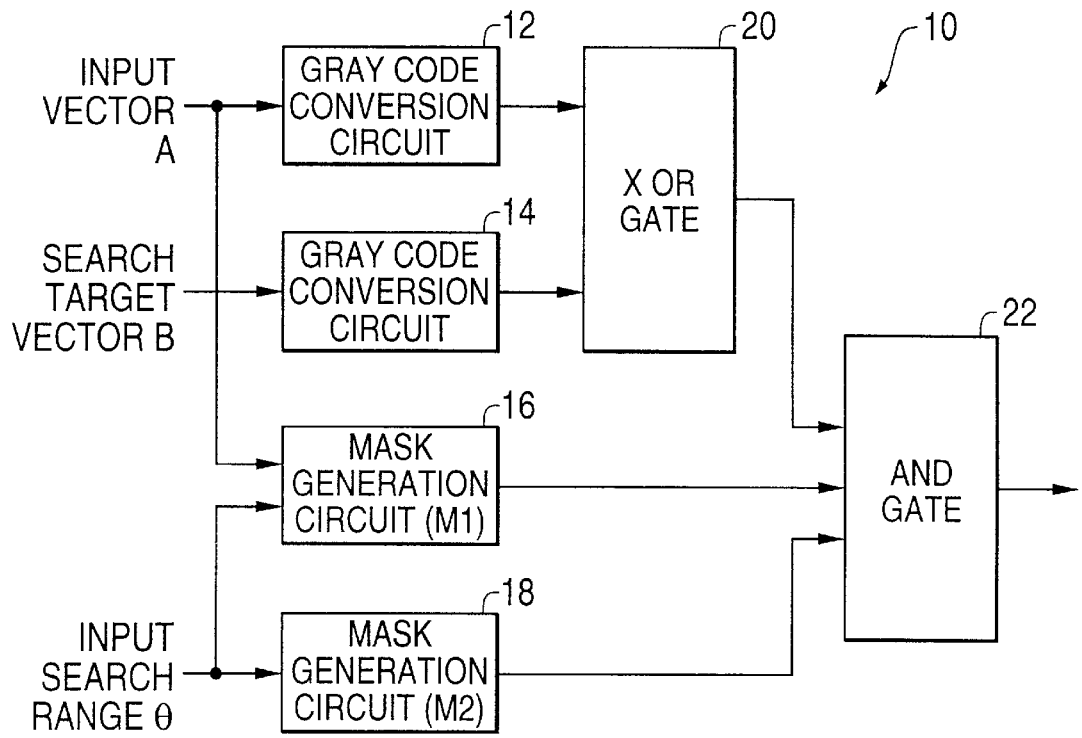
FIG. 6 is a block diagram to show a configuration of the identification judgement circuit which is an application of the vector calculation method in accordance with the present invention.
FIG. 7 is an example Gray code conversion table.

FIG. 6 is a schematic diagram of a configuration of an identification judgement circuit 10, a computation device that applies a vector computation method in accordance with the present invention.

The identification judgement circuit 10, shown in FIG. 6, includes two Gray code conversion circuits 12 and 14 that convert input data to Gray codes. Two mask generating circuits 16 and 18 generate mask data M1 and M2. An XOR circuit 20 conducts XOR for each bit of the two Gray codes from the two Gray code conversion circuits 12 and 14. An AND circuit 22 conducts an AND for each bit of the output data from the XOR circuit 20 and the mask data M1 and M2.

The Gray Code conversion circuit 12 receives an element data Ai of the input vector A and outputs the corresponding predetermined bits Gray codes. The Gray code conversion circuit 14 receives element data Bi of the search target vector B and outputs the corresponding predetermined bits Gray codes. For example, if an element Ai of the input vector A is "21" and the corresponding element Bi of a search target vector B is "20", the Gray code conversion circuit 12 outputs a 5 bit Gray code "11111" corresponding to Ai(=21). The Gray code conversion circuit 14 outputs a 5 bit Gray code "11110" corresponding to Bi (=20).

Each Gray code conversion circuit 12 and 14 possesses a memory such as a ROM storing a Gray code conversion table. When a predetermined bit binary code corresponding to Ai or Bi is inputted as an address of this memory, a corresponding Gray code is outputted as data.

FIG. 7 shows an example Gray code conversion table. Each address corresponds to a 5 bit binary code, and the stored data correspond to 5 bit Gray code. For example, for the address corresponding to Ai=21, the Gray codes stored in the corresponding range, "11111" is outputted.

The mask generating circuit 16 generates mask data M1. This mask data M1 is generated at step 202 in FIG. 2. If ±θi centered on an element Ai of the input vector A is to be a search range, it is to mask the variable bits when the upper limit and the lower limit of this search range are compared.

FIG. 8 is a diagram to show a configuration of the mask generating circuit 16. In the mask generating circuit 16, an ADD circuit 30 adds an element Ai of the input vector A to data θi to specify the search range of the element Ai. A subtraction circuit 32 subtracts Ai from Ai to compute Ai−θ. Two Gray code conversion circuits 34 and 36 convert the respective computed result to predetermined bit (5 bits if the Gray code bits corresponding to Ai are 5 bits) Gray codes. An XNOR circuit 38 attains the XOR for each bit of the two Gray codes converted by the two Gray code conversion circuits 34 and 36 and inverts the result.

If Ai=21 and Bi=1, Gray code conversion circuit 34 outputs the Gray codes "1101" corresponding to Ai+θi=22. The Gray code conversion circuit 36 outputs the Gray codes "11110" corresponding to Ai−θi=20. Consequently, when each bit of these two Gray codes are compared, the XNOR circuit 38 outputs the mask data M1, "11100", wherein "0" represents corresponding bits being different, and "1" represents the corresponding bits being the same.

The mask generating circuit 16 can also be configured, for example, with a conversion table like the Gray code conversion circuit 12, as well as the configuration shown in FIG. 8. FIG. 9 shows an example of a conversion table to generate mask data M1. For example, the binary codes "10101" corresponding to Ai=21, and the predetermined bits (e.g. 2 bits) data "01" corresponding to θi=1 are inputted as an address. In the corresponding range, "11100" is stored as the mask data M1, and responding to the above mentioned address designation, this mask data M1 is read and outputted.

The mask generating circuit 18 generates the mask data M2. This mask data M2 is generated at step 203 in FIG. 2 to mask the lower bits which change in the search range ±θi. When θi is inputted, an integer P is determined which satisfies $2^{P-2} < \theta \leq 2^{P-1}$ (P=0 if θ=0). Then, mask data M2, which has the same number of bits as the Gray code corresponding to Ai, comprising P lower bits being "0" and the remaining upper bits being "1", is outputted. For example, if θi=1, the integer P to satisfy the above mentioned inequality is 1, so that the mask data M2 has "0" only in the lowest bit as in "11110".

The integer P can be determined either by calculation or, as in the Gray code conversion circuits 12, by converting θi to mask data M2 through the use of a conversion table stored in a memory.

FIG. 10 shows a conversion table to generate mask data M2. If θi is to be expressed in 3 bits, then, for example, a binary code "001" corresponding to θi=1 is inputted as an address.

In the corresponding range, "11110" is stored as the mask data M2. Then, responding to the above mentioned address designation, the mask data M2 is read and output.

The XOR circuit 20 receives the Gray codes $[Ai]_g$ from the Gray code conversion circuit 12 and the Gray codes $[Bi]_g$ from the Gray code conversion circuit 14. The XOR circuit 20 conducts XOR for each bit. The AND circuit 22 receives this XOR output and the two mask data M1 i and M2i, and conducts AND for each bit. By these two circuits the computation shown in step 205 in FIG. 2 is conducted.

Consequently, when all the outputted bits of the AND circuit 22 are "0" the element Bi of the search target vector B is included within a predetermined range decided by θi centered on Ai of the input vector A. On the contrary, if at least one bit out of the output of the AND circuit 22 is "1", then element Bi of the search target vector B is not included in the above mentioned predetermined range. In this way, the identification judgement circuit 10 conducts a judgement whether Bi is included in the predetermined range centered on Ai when an element Ai of the input vector A and an element Bi of the search target vector B are inputted through the identification judgement by a simple processing.

In the above mentioned description for the identification judgement circuit 10, plural Gray code conversion circuits 12 and 14, which conduct the same processing, are provided. One common Gray code conversion circuit can replace the two Gray code conversion circuits 12 and 14 through a time shared system.

So far the operation of the identification judgement circuit 10 which focuses on either element of the input vector A or the search target vector B has been described. When plural elements are processed simultaneously, it is acceptable to either repeat the processing bit by bit by the identification judgement circuit 10, or after conducting the Gray code conversion for each element, then conduct a processing for all bits by the XOR gate 20 and the AND gate 22. In this case, the comparison between the input vector A and one search target vector B can be done in one time processing.

Figure 11:
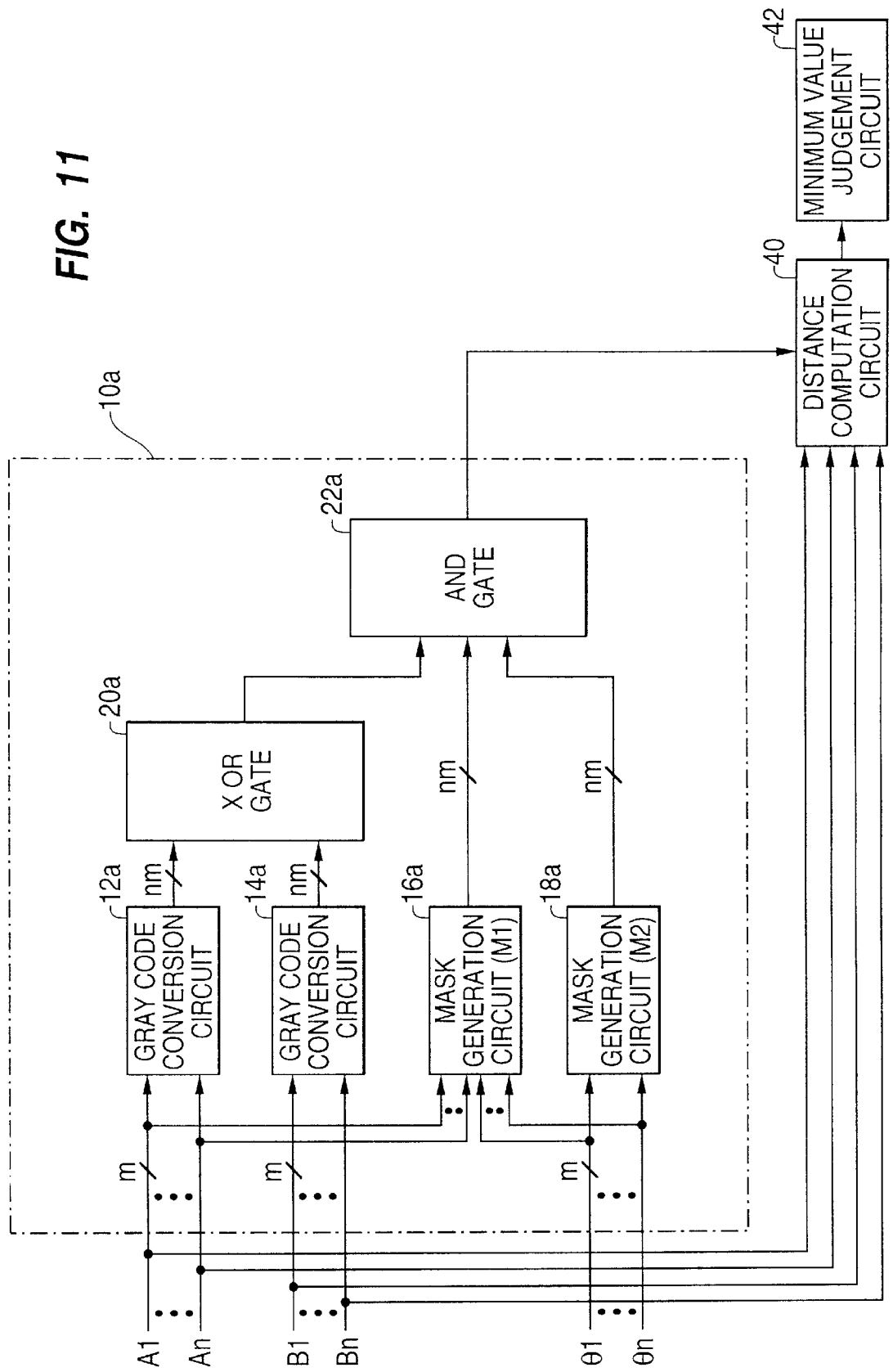
FIG. 11 is a block diagram to show a configuration of the vector search device to search a vector closest to the input vector among plural search target vectors.

FIG. 11 is a diagram to illustrate a configuration of a vector search device to search for the closest vector to the input vector among plural search target vectors. The vector search device shown in FIG. 11 comprises an identification judgement circuit 10a, a distance computation circuit 40, and a minimum value judgement circuit 42.

The identification judgement circuit 1 Oa is a variation of the identification judgement circuit 10 shown in FIG. 6 in order to conduct the identification judgement for all elements of both the input vector A and the search target vector B. As an example, suppose the input vector A and the search target vector B are n-order vectors respectively and each element is expressed with m-bits.

The identification judgement circuit 10a comprises two Gray code conversion circuits 12a and 14a, two mask generating circuits 16a and 18a, an XOR gate 20a, and an AND gate 22a.

The Gray code conversion circuit 12a corresponds to the Gray code conversion circuit 12 shown in FIG. 6. The Gray code conversion circuit 12a receives n-number element data of the input vector A and outputs a total of n*m bit data through converting to m-bit Gray codes for each element.

The Gray code conversion circuit 14a corresponds to the Gray code conversion 14 in FIG. 6. The Gray code conversion circuit 14a receives n-number element data of a search target vector B and outputs a total of n*m bit data through converting to m-bit Gray codes for each element.

The mask generating circuit 16a corresponds to the mask generating circuit 16, and based on θi which is set for each element of the input vector A and each element data Ai of the input vector A, outputs the mask data M1 with m-bits for each element, altogether n*m bits.

The mask generating circuit 18a corresponds to the mask generating circuit 18 shown in FIG. 6, and based on θi which is set for each element of the input vector A, outputs the mask data M2 with m-bits for each element, altogether n*m bits.

In this manner, the Gray code conversion corresponding to the n-number elements of the input vector A and the search target vector B, and the generation of the mask data M1 and M2 are conducted in parallel. The identification judgement for all elements are conducted simultaneously by XOR gate 20a and AND gate 22a.

Consequently, when each element of the search target vector B is included within a range of θi which set for each element of the input vector A, all the bits of the n*m bits data outputted from the identification judgement circuit 10a become "0".

The distance computation circuit 40 shown in FIG. 11 computes the distance between the input vector A and the search target vector B when all the bits of the outputted data of the identification judgement circuit 10a are "0". Among computation distances, there are, for example, Euclid distance and Manhattan distance, etc. The minimum value judgement circuit 42 conducts the minimum value judgement based on the computation result of the distance calculation circuit 40, and extracts the search target vector B which has the minimum distance.

In this way, through a simple identification judgement by the identification judgement circuit 10a, the range of the search target vector B close to the input vector A is narrowed down from plural search target vectors B. Then, distance computation occurs between the narrowed down search target vector B and the input vector A to find the search vector B which has the smallest distance. Consequently, even if there are a lot of numbers in the search target vector B, by conducting the simple identification judgement, the number of the search target vectors B for the distance computation will be drastically reduced. Thus, the burden of the search processing to find the one close to the input vector among plural search target vectors will be reduced and its processing time can be shortened.

Figure 12:
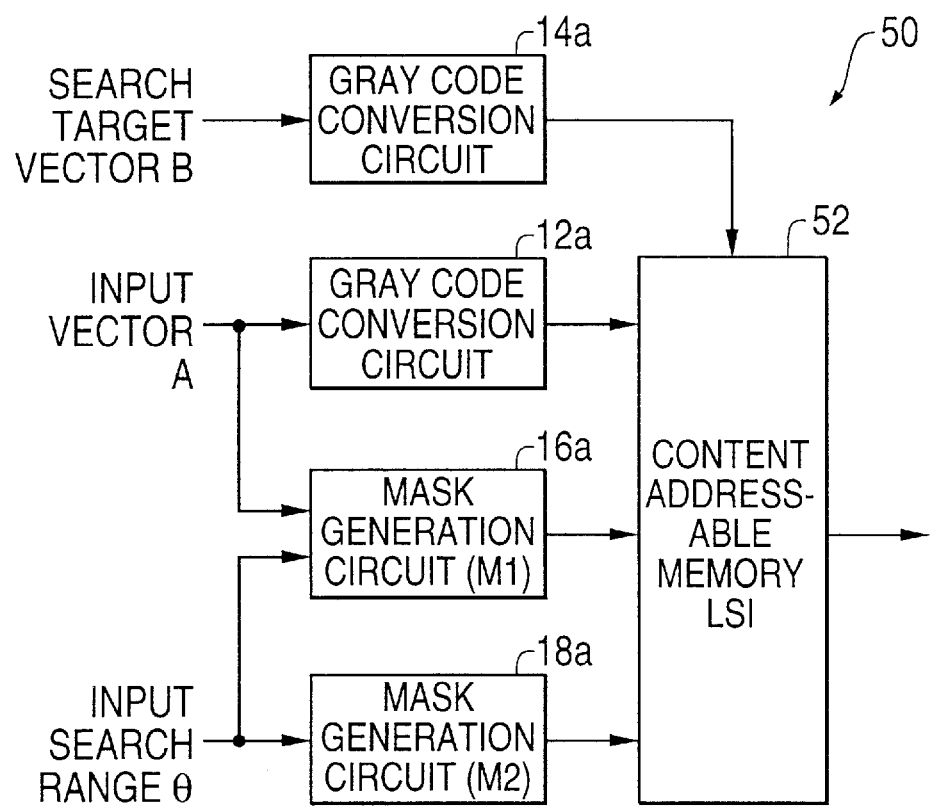
FIG. 12 is to show an example of a modification for the identification judgement circuit.
Figure 13:
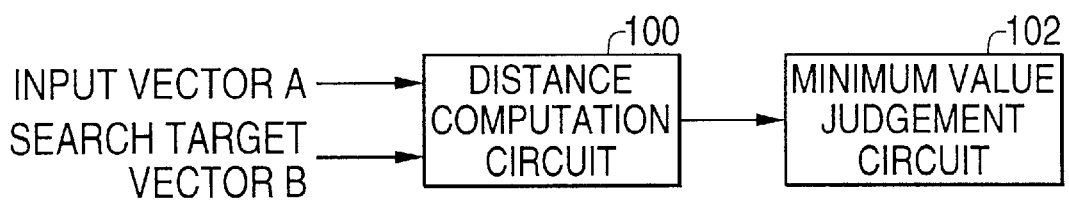
FIG. 13 is a diagram to show a configuration to make a comparison between the input vector and the search target vector data.

FIG. 12 is a diagram of a variation of the identification judgement circuit using a Content Addressable Memory LSI. An identification judgement circuit 50 shown in FIG. 12 includes two Gray code conversion circuits 12a and 14a; two mask generating circuits 16a and 18a, as shown in FIG. 11; and the Content Addressable Memory LSI 52. The Content Addressable Memory LSI 52 checks the content of the Gray codes corresponding to all the elements of the previously stored search target vector B, when the Gray codes corresponding to all the elements of the input vector A are inputted in parallel and is able to conduct the identification judgement only for the plural bits excluding the masked data by the mask data M1 and M2.

The Content Addressable Memory LSI 52 needs to convert each element of the wanted search target vector B for the identification judgement to Gray codes by the Gray code conversion circuit 14a and store them in advance.

In this way, the Content Addressable Memory LSI 52 allows the identification judgement for each element of the input vector A and the search target vector B with high speed. The hardware configuration of the Content Addressable Memory LSI 52 determines the processing speed. In general, it is possible to conduct the identification judgement up to several k bits plural bits data, so that even multiple order vectors can be handled for the identification processing with all elements as target for the high speed processing.

The distance computation circuit 40 and the minimum value judgement circuit 42 shown in FIG. 11 may be connected to the back part of the Content Addressable Memory LSI 52. The distance calculation for the input vector A is only conducted for those search target vectors B that the identification of all the bits the Content Addressable Memory LSI 52 pays attention to have been verified. Then, the search target vector B which has the minimum distance is extracted.

Other embodiments of the invention will be apparent to those skilled in the art from consideration of the specification and practice of the invention disclosed herein.

Though the above mentioned embodiments describe examples of expressing each element of the input vector A or the search target vector B in 4 bits or 5 bits, the elements may be expressed with less than 3 bits or more than 6 bits.

The sixth bit Gray code can be attained by describing the 5 bit Gray codes shown in FIG. 7 arranged symmetrically between top and bottom and then assigning "0" to the top of the first 32 and "1" to the top of the remaining 32. Through the same process, Gray codes above 7 bits can be attained.

The above described embodiments illustrate examples of converting binary codes to Gray codes using a conversion table of, for example, the Gray code conversion circuit 12. It is also acceptable to use a logical operation for the conversion. More specifically, Gray codes can be attained by conducting XOR for each bit of the binary codes for the conversion target and the data after shifting the binary code to the right 1 bit. For example, the binary code of "21" is "10101". The data attained by shifting the binary code to the right 1 bit is "01010". By conducting XOR for each bit of these two data, the Gray code corresponding to "21" is attained as "11111".

In the above mentioned embodiment, a comparison of each element between the input vector A and the search target vector B is conducted, but if it is the first order vector then it becomes simply a comparison of numeric data.

For bits other than those bits designated by the first and the second mask data, a comparison for each element of the input vector and the search target vector expressed as Gray codes is conducted, and by a simple bit operation the search field is narrowed.

According to the present invention, the distance between two vectors is computed only when all the elements of the input vector and the search target vector are judged to have met with the search condition, judging the minimum value of the distance if there are plural search target vectors. Compared with computing the distance between all the search target vectors and the input vector, the burden of the processing to search for the search target vector which has the minimum distance is reduced and the processing time is shortened.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A vector computation device for receiving an input vector and for determining whether one element of a search target vector is within a predetermined search range of one element of the input vector, the search range having an upper limit value and a lower limit value bracketing the input vector, the device comprising;
    a first Gray code conversion means for converting the one element of the input vector to a first Gray code;
    a second Gray code conversion means for converting the one element of the search target vector to a second Gray code;
    a first mask generating means for generating first mask data by comparing Gray codes corresponding to the upper limit value and the lower limit value, the first mask data indicating the similarities between the Gray codes corresponding to the upper limit value and the lower limit value;
    a second mask generating means for generating second mask data by calculating the number of bits corresponding to the size of the search range; and
    means for determining whether the one element of the search target vector is within the search range by comparing the results of XOR operation between the first and the second Gray codes to the first and second mask data.

2. The vector computation device as claimed in claim 1, wherein the first and the second Gray code conversion means include means for performing an XOR operation between the input data binary code and a binary code corresponding to the input data binary code shifted one bit to the right.

3. The vector computation device as claimed in claim 1, wherein the first and the second Gray code conversion means comprise a conversion table storing the correspondence between vectors and Gray codes.

4. The vector computation device as claimed in claim 1, wherein said first mask generating means comprises;
    a third Gray code conversion means for converting the upper limit value of the search range to a third Gray code;
    a fourth gray code conversion means for converting the lower limit of the search range to a fourth Gray code; and
    means for performing an XOR operation between the third Gray code and the fourth Gray code.

5. The vector computation device as claimed in claim 1 wherein the first mask generating means comprises a conversion table storing the search range of the input vector.

6. The vector computation device as claimed in claim 1, wherein the second mask generating means determines an integer P wherein $2^{P-2}<\theta \leq 2^{P-1}$ and wherein $-\theta$ to $+\theta$ is the search range.

7. The vector computation device as claimed in claim 6, wherein the second mask generating means comprises a conversion table storing the correspondence between the integer P and the search range.

8. The vector computation device as claimed claim 1 further comprising;
    a distance computation means for computing the distance between the input vector and the search target vector when all elements of the input vector and the search target vector are within the predetermined search range; and
    a minimum value judgement means for judging the minimum value out of the distances calculated by said distance calculation means when more than one search target vector is within the predetermined search range.

9. A vector computation method for determining whether one element of a search target vector is within a predetermined search range of one element of an input vector, the search range having an upper limit value and a lower limit value bracketing the input vector, the method comprising the steps of:
    converting the one element of the input vector into a first Gray code;
    converting the one element of the search target vector into a second Gray code;
    generating mask data based on the upper limit value and the lower limit value;
    comparing the first Gray code to the second Gray code to obtain a first comparison result; and
    comparing the first comparison result to the mask data.

10. The method as claimed in claim 9, wherein the step of converting the one element of the input vector into a Gray code includes the sub-step of accessing a look up table stored in a memory device.

11. The method as claimed in claim 10, wherein the step of converting the one element of the search target vector into a Gray code includes the sub-step of accessing a look up table stored in a memory device.

12. The method as claimed in claim 9, wherein the step of generating mask data includes the sub-step of accessing a look up table stored in a memory device.

13. The method according to claim 9, wherein the step of comparing the first Gray code to the second Gray code includes the sub-step of inputting the first Gray code and the second Gray code, bit-by-bit, into an XOR logic gate.

14. The method according to claim 9, wherein the step of comparing the first comparison result to the mask data includes the sub-step of inputting the first Gray code and the second Gray code, bit-by-bit, into an AND logic gate.

15. A vector computation method for determining whether one element of a search target vector is within a predetermined search range of one element of an input vector, the search range having an upper limit value and a lower limit value bracketing the input vector, the method comprising the steps of:

converting the one element of the input vector into a first Gray code;

converting the one element of the search target vector into a second Gray code;

generating mask data based on the upper limit value and the lower limit value;

calculating the XOR operation of the first Gray code and the second Gray code; and calculating the AND operation of the result of the XOR operation and the mask data.

16. A vector computation method for determining whether one element of a search target vector is within a predetermined search range of one element of an input vector, the search range having an upper limit value and a lower limit value bracketing the input vector, the method comprising the steps of:

converting the one element of the input vector into a first Gray code;

converting the one element of the search target vector into a second Gray code;

generating first mask data based on the upper limit value and the lower limit value;

generating second mask data based on the extend of the search range;

calculating the XOR operation of the first Gray code and the second Gray code; and calculating the AND operation of the result of the XOR operation, the first mask data, and the second mask data.

* * * * *